A. M. SMITH.
Knob Attachment.
No. 226,123. Patented Mar. 30, 1880.
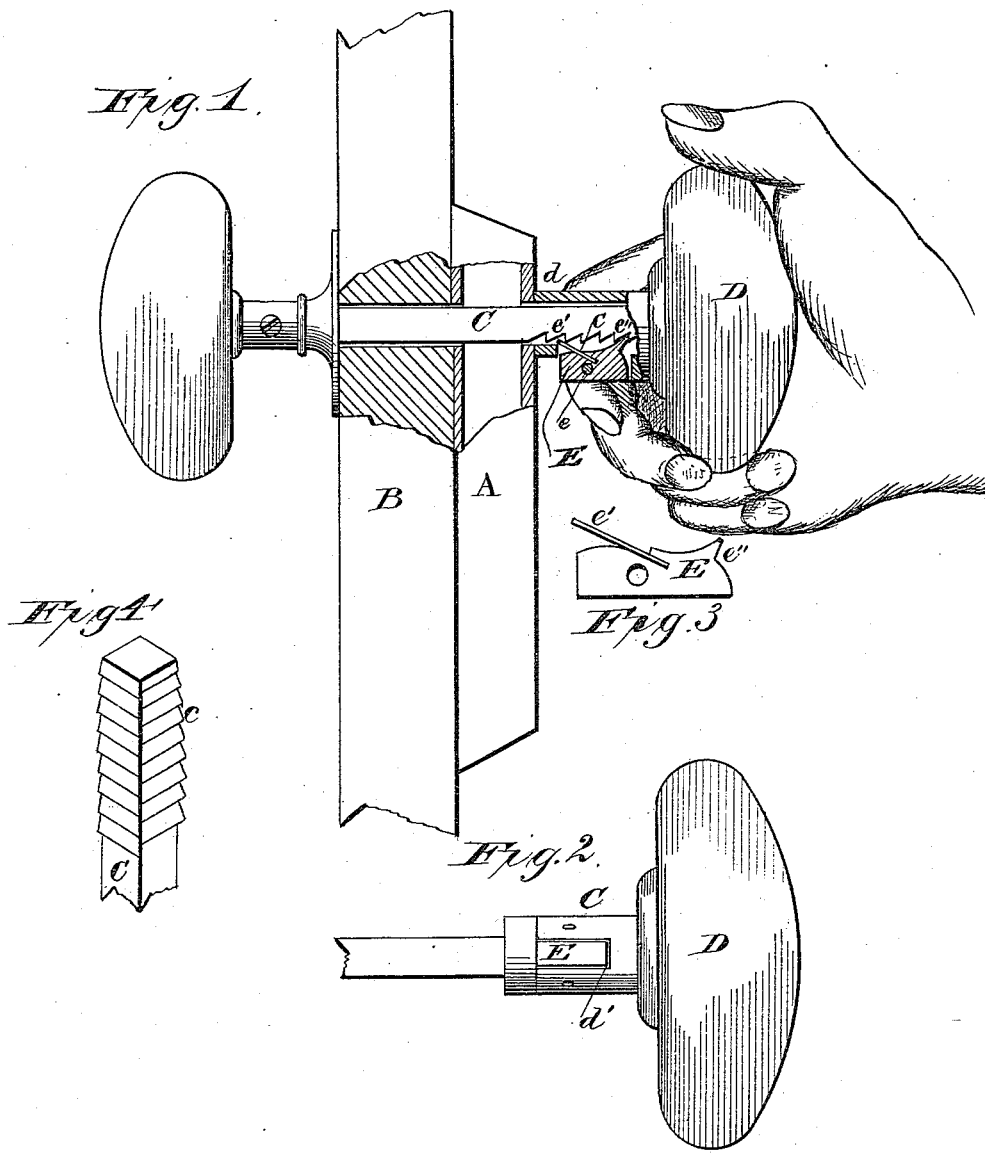

UNITED STATES PATENT OFFICE.

ALPHA M. SMITH, OF TAMPICO, ILLINOIS.

KNOB ATTACHMENT.

SPECIFICATION forming part of Letters Patent No. 226,123, dated March 30, 1880.

Application filed February 21, 1880.

*To all whom it may concern:*

Be it known that I, ALPHA M. SMITH, a citizen of the United States, residing at Tampico, in the county of Whiteside, and State of Illinois, have invented certain new and useful Improvements in Door-Knob Attachments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a view in section, showing the knob as attached to the door. Fig. 2 is a top plan of knob and stem. Fig. 3 is a detail of the pawl. Fig. 4 is a detail of the spindle end.

This invention relates to knob attachments; and the novelty consists in the special detail of the construction and arrangement of the several parts, all as will now be more fully set out and explained.

In the accompanying drawings, A is any usual or ordinary lock on a door, B; and C is the spindle of the handle, notched at $c$ on two or more of its sides, at the end where it fits into the shank or stem $d$ of the knob D. These notches or indentations are not necessarily made on the same lines on all the sides of the spindle end, but preferably break joints.

In a socket or slot, $d'$, through the stem of the knob, the dog or pawl E is placed, and is movable on its pivot $e$. On the under side of this dog is fixed the spring $e'$. This dog is pivoted out of center, so that its forward end may be tilted a little to make the insertions of the spindle easy; but so soon as the spindle has been pushed in the dog is raised to a horizontal position, and its top will then, by means of the spring $e'$, which bears on the spindle, be made flush with the top of the stem. When the spindle is thus in place in the stem of the knob the end projection, $e''$, of the dog engages in one of the serrations on the spindle and detains the spindle in the stem. The spring $e'$ will now serve, as above described, to cause the part $e''$ to take firmer hold in the serrations in which it engages.

The knobs can thus be fitted to the door very easily, and when occasion occurs can very easily be detached from the door by pressing down on the forward end of the dog or pawl. This movement serves to disengage its rear projection from its seat in the spindle, and the spindle is then withdrawn from the stem.

The line of serrations on the spindle end being broken, the spindle can be fitted to a door of any thickness by merely turning it so that the projecting end of the pawl or dog engages on such a serration as will bring the other knob close to the rose.

The stem of the other knob may be fixed on the spindle or detachable, as now shown.

I am aware that heretofore spring-pawls have been placed on the inside of the stem or handle to engage on the notched spindle, and also that a separate spring-bolt has been arranged to pass through the stem for the same purpose. My device, in its arrangement of parts and in its construction, differs from all these, and I do not claim, broadly, the features above generally referred to.

Having thus described my invention, what I consider new, and desire to secure by Letters Patent, is—

The pawl E, having projections $e''$ and spring $e'$, pivoted in slot $d'$ of the stem $d$ of a door-knob, and flush with said stem, combined with the notched spindle C, substantially as and for the purposes set forth.

In testimony whereof I affix my signature in presence of two witnesses.

ALPHA M. SMITH.

Witnesses:
JAMES T. POWELL,
JOHN L. GINCK.